July 9, 1940.  P. F. HAWLEY  2,206,891
ELECTRICAL LOGGING OF EARTH FORMATIONS
Original Filed June 17, 1938   3 Sheets-Sheet 1
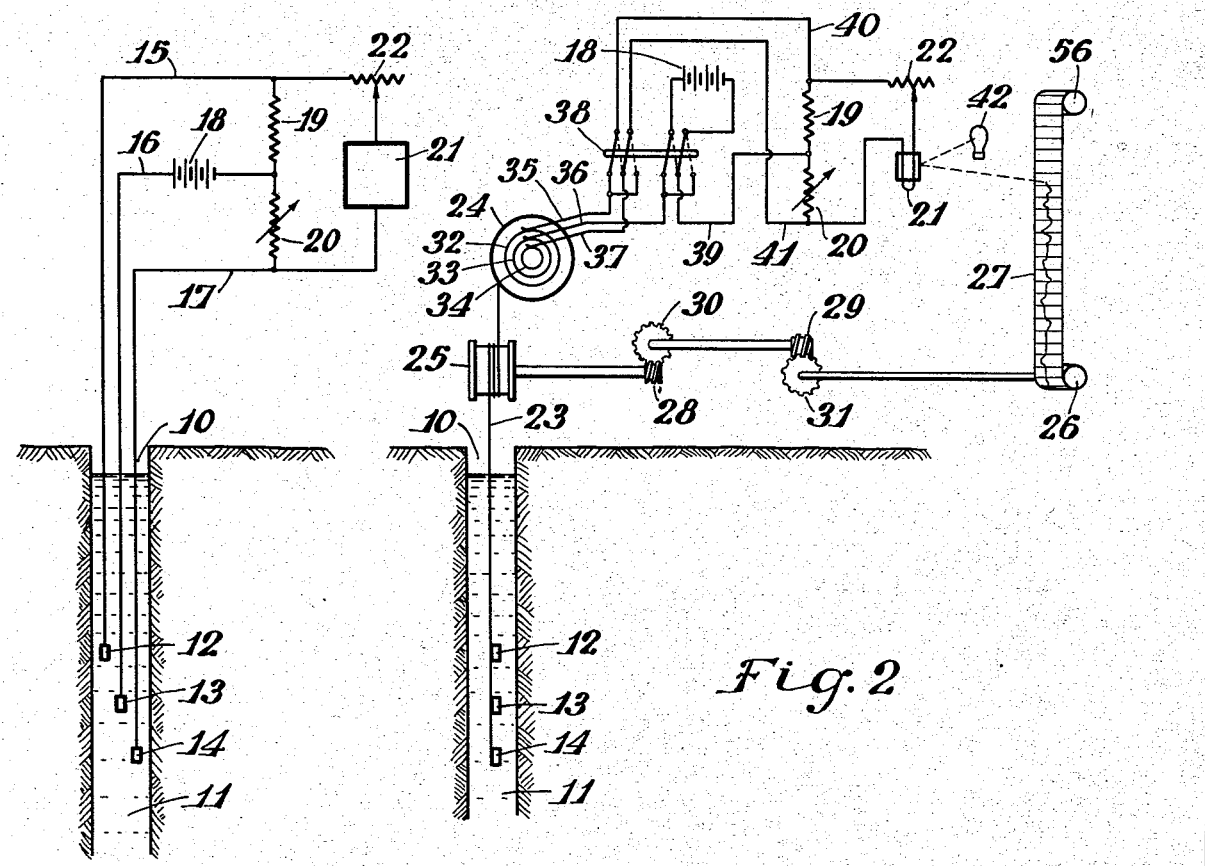
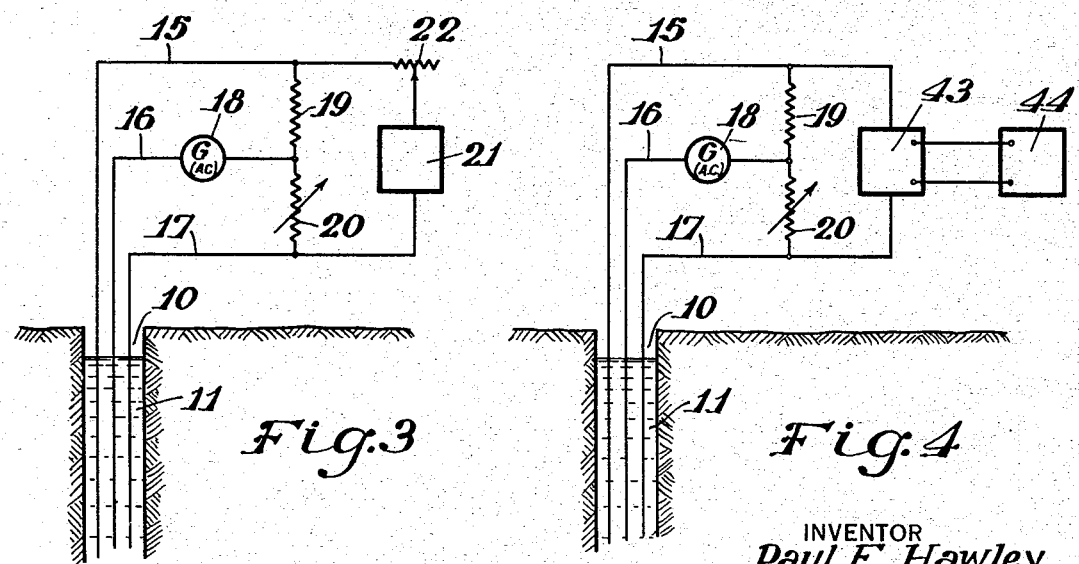
INVENTOR
Paul F. Hawley
BY Geo. L. Parkhurst
ATTORNEY

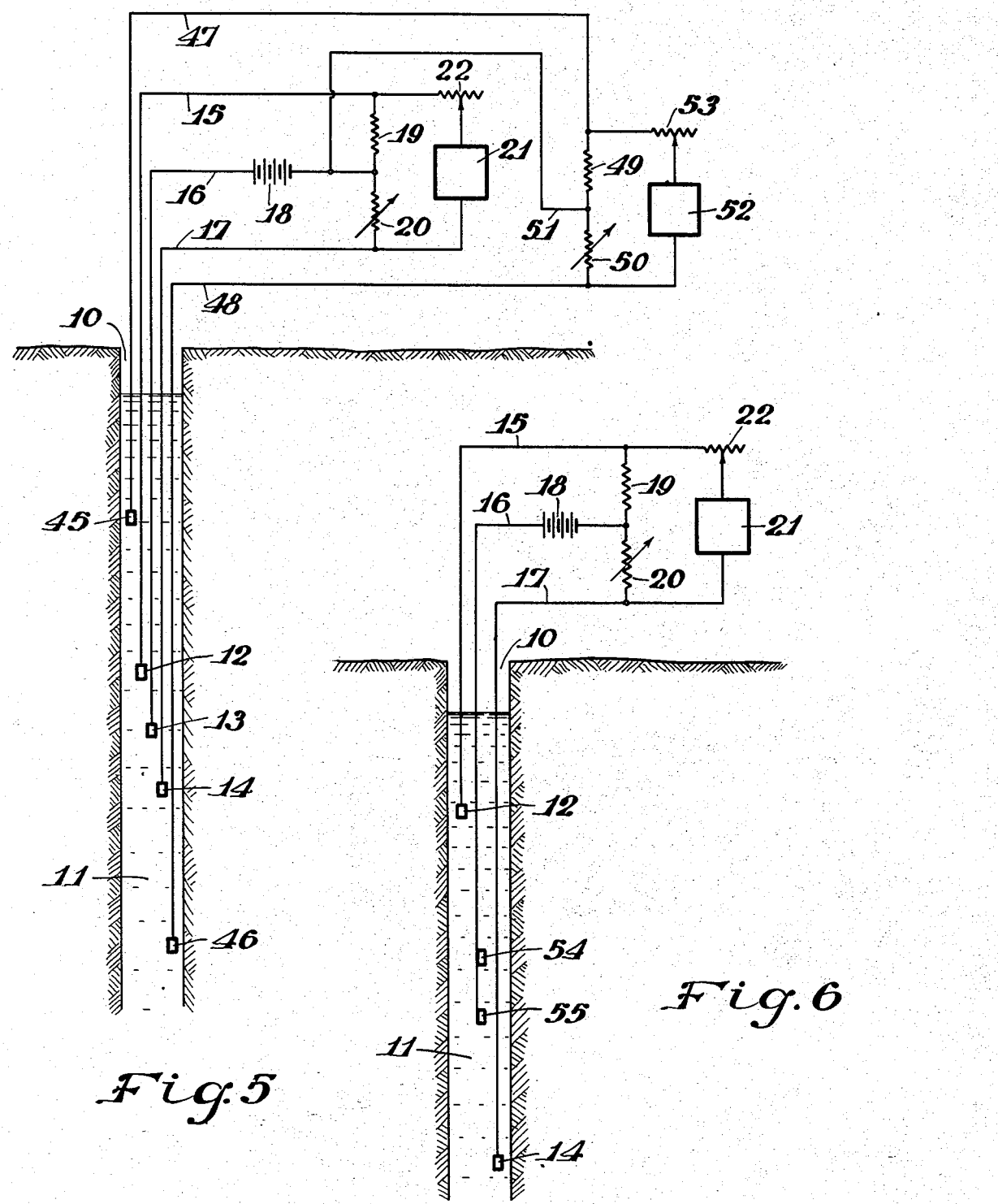

Patented July 9, 1940

2,206,891

UNITED STATES PATENT OFFICE 2,206,891

ELECTRICAL LOGGING OF EARTH FORMATIONS

Paul F. Hawley, Tulsa, Okla., assignor to Stanolind Oil and Gas Company, Tulsa, Okla., a corporation of Delaware Application June 17, 1938, Serial No. 214,269
Renewed October 7, 1939

20 Claims. (Cl. 175—182)

This invention relates to the electrical logging of earth formations and more particularly to a method and apparatus for making a record of the discontinuities in the walls of a well or bore hole due to the various earth strata traversed thereby.

A number of methods of making a log of the strata in a well are known in the art, and among these methods are those involving the measurement of the specific resistivities of the strata at various levels by means of one or more electrodes lowered into the bore hole when the latter is filled with an electrically homogeneous fluid.

The theoretical considerations underlying these methods are well-known to those skilled in the art and will not be given here. It may be stated however that the resistance of the ground to a current of electricity flowing through it from an electrode depends in large measure upon the specific resistivity of the ground in the immediate vicinity of the electrode. Since oil or gas sands have a relatively high specific resistivity, and shale an intermediate and water-bearing sands a relatively low specific resistivity, by passing such an electrode through a bore hole and measuring the resistance between the electrode and another electrode at the surface or above it in the bore hole, a log may be made of the formations at various depths.

The principal utility of the records obtained by these known methods lies in the correlation of the records from a number of wells in a given vicinity so as to yield information as to the subsurface geological structure throughout the area covered by the wells. These records are usually difficult to correlate because the electrical variations obtained due to discontinuities in the formations traversed are quite gradual and of rather small amplitude, and thus often fail to provide a well-marked indication of the depth at which these discontinuities exist.

It is an object of my invention to provide a novel and rapid method of electrically logging wells which gives a clear record of the formations encountered in a well particularly suitable for correlation purposes. A further object is to provide a method and apparatus by which a direct response to changes in geological structure can be obtained by a single operation. Another object is to provide a simplified apparatus for logging wells which is self-contained and requires no ground connection. Further objects will be apparent from the following detailed description read in connection with the drawings in which:

Figure 1 shows a schematic view of a simple apparatus embodying my invention;

Figure 2 shows schematically apparatus according to the invention utilizing direct current energy;

Figures 3 and 4 show schematically alternating current systems for practicing my invention;

Figures 5 and 6 illustrate modified electrode arrangements; and

Figure 7:
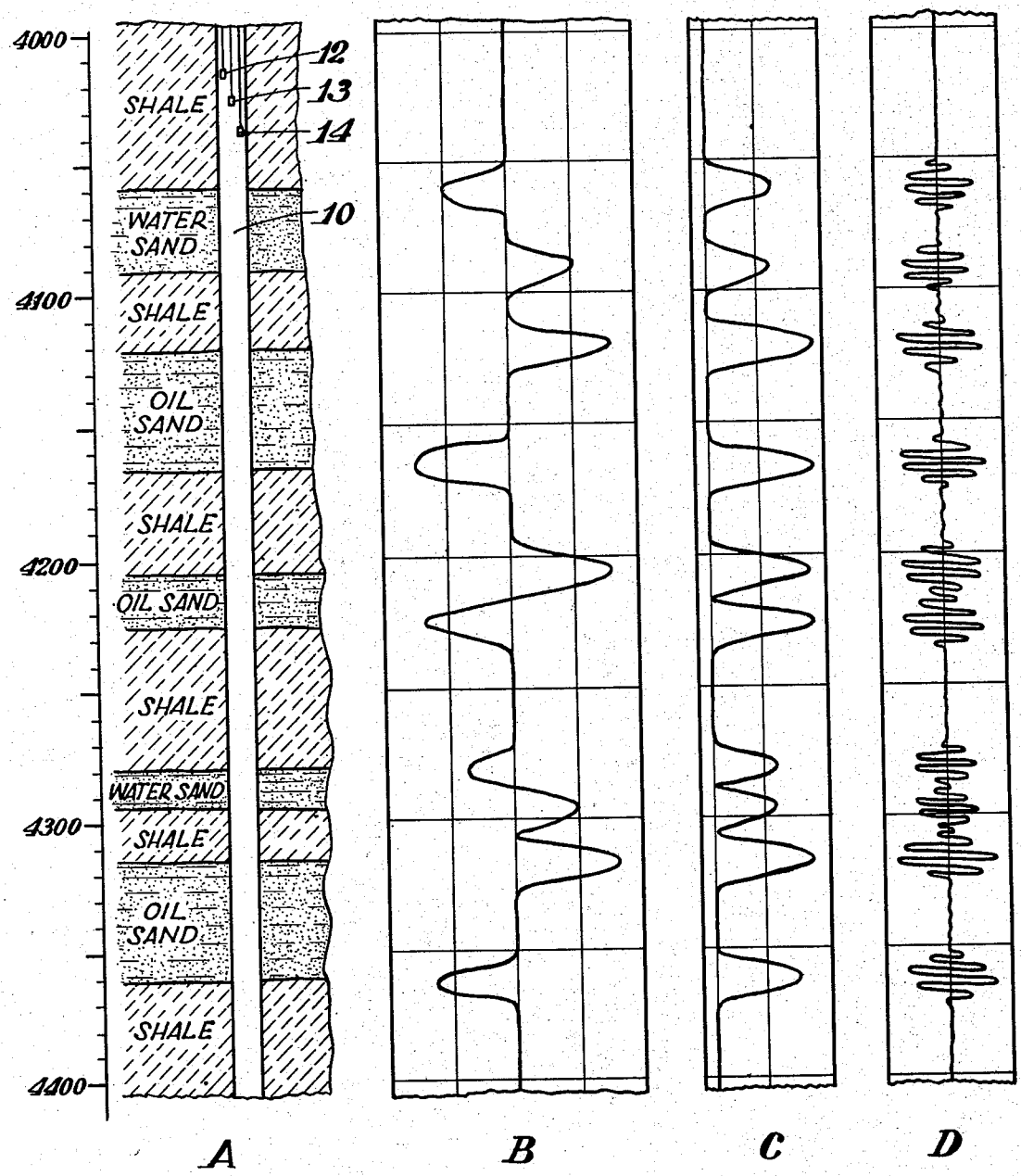
Figure 7 illustrates in an idealized manner the type of records which will be obtained by the use of the apparatus shown in Figures 1, 2, 3 and 4 in juxtaposition with an idealized map of the formations penetrated by a well which yield such records.

I have found that the discontinuities of the strata penetrated by a bore hole can be located very accurately by directly measuring a function of the differences in electrical impedance of the formations which are vertically adjacent or nearly so. This method may best be described in connection with Figure 1, in which 10 is an uncased bore hole preferably containing an electrically homogeneous fluid 11, which may be drilling mud, water, etc.

The logging apparatus includes an array of three vertically-spaced electrodes 12, 13 and 14 suspended in the well, preferably in such a way that the distance between electrodes 12 and 13 is equal to that between electrodes 13 and 14. Electrodes 12, 13 and 14 may be made of metal, and when well 10 is dry at levels which are to be logged can be arranged to make direct contact with the walls of the well. The middle electrode 13 is connected by means of an electrical conductor 16 to one pole of a source of electromotive force 18, which is shown as a battery, but which can be any type of generator of direct or alternating current. Upper electrode 12 is connected by means of electrical conductor 15 through resistance 19 with the other pole of the source of electromotive force 18, and electrode 14 is similarly connected through conductor 17 and variable resistance 20. A detecting device 21, which can take the form of a galvanometer or the like when direct current is used, or a milliammeter, vibration galvanometer, or oscillograph when alternating current is used, is connected across resistances 19 and 20 through adjustable resistance 22. Detecting device 21 is preferably of the recording type arranged so that the current flowing therethrough is recorded as a function of the depth of the electrode system. The purpose of resistance 22 is to regulate the amount of the current flowing through detecting device 21 so that the sensitivity and consequently the detail of the records produced may be varied for different conditions.

It will be readily seen that this apparatus comprises a Wheatstone bridge with resistances 19 and 20 as two of the arms thereof, the resistances between electrodes 12 and 13 and electrodes 13 and 14 as the other two arms of the bridge, the source of electromotive force 18 across one diagonal and detecting device 21 across the other diagonal. Variable resistance 20 is set at a value such that under conditions of use no current will flow to detecting device 21 when the electrical characteristics of the formations between electrodes 12 and 13 and electrodes 13 and 14 are the same. Under such conditions it is apparent that when these electrodes are equally spaced, the resistances between them are equal and variable resistance 20 will be adjusted to a value approximately equal to that of resistance 19. When the distances between the electrodes are unequal, variable resistance 20 is set to a value determined according to the following well-known Wheatstone bridge equation:

$$R_1 = R_2 \frac{R_3}{R_4}$$

where
$R_1$ = the value of resistance $20_1$
$R_2$ = the value of resistance $19_1$ and
$\frac{R_3}{R_4}$ = the ratio of the resistances between electrodes 13 and 14 and electrodes 12 and 13.

Since the bridge is balanced when the formations intercepted by the electrodes have the same electrical characteristics, it is apparent that when formations of other characteristics are encountered, the resistance between electrodes 13 and 14 will change, the bridge will become unbalanced and a current will flow through detecting device 21.

In carrying out the logging operation using apparatus of the type shown in Figure 1, the well 10 is preferably filled with an electrically homogeneous fluid 11 such as drilling mud or water. The fluid which is present in the well during a drilling operation is usually quite satisfactory unless it has been allowed to stand undisturbed so long that stratification has occurred. The vertically-spaced electrodes 12, 13 and 14 are then lowered by well-known means not shown into well 10, preferably at a substantially constant rate, which may vary for example from about 10 to 500 or more feet per minute. Alternatively the electrodes can be raised, or runs can be made in both directions in order to check results. For most purposes the higher speeds are preferred, since they minimize polarization effects on the electrodes. As long as the formations traversed have the same resistivity no current will flow through detecting device 21, but if the lower electrode 14 enters a zone in which the formation has a higher resistivity, the resistance between electrodes 13 and 14 becomes greater than that between electrodes 12 and 13 and current will therefore flow through detecting device 21. Similarly when a zone of relatively lower resistivity is entered by electrode 14, current will flow through device 21, but in the opposite direction.

It is apparent that the greatest difference in resistance between electrodes 13 and 14 and electrodes 12 and 13 will occur when middle electrode 13 is at the boundary level between two dissimilar formations, and that detecting device 21 will give a maximum reading at that point. It is preferred therefore that the record made by device 21 show the amount of current flow plotted against the position of middle electrode 13 in the well.

The results obtained by my improved method using a recording galvanometer and a battery or direct current generator as a source of energy may be better understood by reference to Figure 7 in which A represents an idealized cross-section of the strata traversed by a bore hole and B represents the record obtained. The electrodes 12, 13 and 14 are indicated as being 10 feet apart, but in practice this distance may range from about 1 to about 25 feet.

It will be observed from Figure 7 that as long as the electrodes are in the shale formation between 4000 and 4060 feet, the record closely follows the center line of chart B, but as electrode 14 enters the water sand between 4060 and 4090 feet the bridge becomes unbalanced, current flows through detecting device 21, and the record trace moves to the left, thus indicating that the resistance between electrodes 13 and 14 is lower than that between electrodes 12 and 13. When middle electrode 13 is at the level of the dividing line between the shale and the water sand, the maximum difference in resistance exists and the trace therefore reaches its maximum deflection at 4060 feet. At 4070 feet the trace has again returned to the center position, since when the middle electrode 13 is at that level, both of the other electrodes are at the water sand and the bridge is again balanced. Similarly, when the electrodes pass from the water sand into the shale at 4090 to 4120 feet, the record shows a deflection having a maximum at 4090 feet, but in this case it is to the right, because the resistance between electrodes 13 and 14 exceeds that between electrodes 12 and 13. As the electrodes are lowered further and the oil sand at 4120 to 4165 feet is encountered, the discontinuity is shown by a deflection to the right having its maximum at 4120 feet, since oil sand has a higher resistance than shale. Each of the discontinuities encountered in the well is similarly recorded so that the final record shows the level at which each occurs.

When the source of electromotive force 18 is of the alternating current type, similar records can be obtained by using a recording wattmeter as detecting device 21 with the unbalanced bridge current flowing through one coil as shown in Figure 1 and the potential of generator 18 applied across the other coil.

Records of this type from several neighboring wells may be correlated to give information from which the geological structure in the vicinity may be deduced. Further, an indication is obtained as to the type of formation at each level. In chart B of Figure 7 it will be noted that an oil sand is indicated by a deflection first to the right and then to the left, whereas a water sand is indicated by a deflection first to the left and then to the right.

In Figure 2 an uncased bore hole 10 is shown containing an electrically homogeneous fluid 11. Three spaced electrodes 12, 13 and 14 are supported in the well by means of insulated cable 23 containing three electrical conductors which lead from the three electrodes. Cable 23 is normally wound upon drum 24, which is placed adjacent the top of the well, and the raising and lowering of the electrodes is controlled by rotating drum 24 by suitable means not shown. Between drum 24 and the well 10 cable 23 passes around a spool 25 which causes a recording strip or film to move in synchronism with the movement of the electrodes. As shown, the movement of spool 25 is transmitted to a spool 26 to wind a photographic film 27 from spool 56 by means of worms 28 and 29 and worm wheels 30 and 31. It is apparent, however, that any suitable mechanism for maintaining synchronism between the recording chart or film and the cable may be used, and the well-known Selsyn motors are particularly suitable for this purpose.

The electrical conductors in cable 23 which are attached at their lower ends to electrodes 12, 13 and 14 are connected at their opposite ends with slip rings 32, 33 and 34, respectively, on the exterior of drum 24. Brushes 35, 36 and 37 contact slip rings 32, 33 and 34, respectively, and are connected to a double reversing switch 38 which is capable of being changed at definite intervals from one position to the other by well-known means not shown. When switch 38 is in the position shown brush 36 is connected to one pole of battery 18 while the other pole is connected by means of conductor 39 to the junction point of resistance 19 and variable resistance 20. Brush 35 is shown connected by means of conductor 40 to the other end of resistance 19, and brush 37 is similarly connected to the other end of resistance 20 by means of conductor 41. A galvanometer 21 and adjustable resistance 22 are connected across resistances 19 and 20. In this case galvanometer 21 is shown equipped with a mirror for reflecting light from lamp 42 on film 27.

When reversing switch 38 is in the position shown the circuit is exactly the same as that in Figure 1, but when this switch is thrown to the other position as indicated by the dotted lines, the polarity of the battery is reversed and the connections between electrodes 12 and 14 and resistances 19 and 20 are simultaneously reversed. In this way the flow of current through the electrodes is reversed so that no appreciable amount of polarization may take place thereon while the direction of flow through galvanometer 21 is not changed. If galvanometer 21 is of a type having a relatively long natural period of deflection the record produced will be substantially identical to that produced by the apparatus shown in Figure 1 and illustrated in Figure 5 as Chart B. Reversing switch 38 may be of the drum type and may be operated at any desired rate of reversal.

Figure 3 shows schematically apparatus which can be used for alternating current operation. Conductors 15, 16 and 17 represent leads from electrodes 12, 13 and 14, respectively, as in Figure 1. Conductor 16 is connected to a source of alternating current 18 whose other pole is connected to resistance 19 and variable resistance 20. Conductors 15 and 17 are respectively connected to the other terminals of resistances 19 and 20. A suitable recording milliammeter 21 and an adjustable resistance 22 are connected across resistances 19 and 20, for the purpose of determining when the Wheatstone bridge having resistances 19 and 20 and the resistances between electrodes 12 and 13 and electrodes 13 and 14 as arms is unbalanced and recording the extent of the current flowing through milliammeter 21.

Figure 4 is identical with Figure 3 with the exception of the equipment for measuring and recording the current flow when the bridge is unbalanced, which in this case is shown as an amplifier 43 and an oscillograph 44 of the usual type. Under some conditions the amplifier may be omitted or replaced by an adjustable resistance.

A modification of apparatus according to my invention is illustrated in Figure 5, in which electrodes 12, 13, and 14 are spaced relatively close together, e. g., from about 1 to about 5 feet, and have the same leads and surface equipment as in Figure 1. However, two additional electrodes 45 and 46 are spaced a relatively great tance, e. g., from about 10 to about 30 feet, above and below electrode 13, respectively, and are provided with conductors 47 and 48 connected across resistances 49 and 50. Conductor 51 connects battery 18 with resistances 49 and 50 so as to complete a bridge circuit as described above and detecting device 52 and resistance 53 are placed across resistances in order to measure the unbalance of the bridge circuit. By means of this apparatus I am able to log a well and simultaneously obtain detailed records from device 21 and records showing only major discontinuities from device 52. It is apparent that by the use of suitable switches I may omit detecting device 52 and employ device 21 alternately to measure the unbalance in the bridge including electrodes 12 and 14, and that including electrodes 45 and 46.

In localities where the discontinuities encountered are quite gradual, the arrangement shown in Figure 6 can be used to advantage. This differs from Figure 1 only in that a pair of interconnected electrodes 54 and 55 spaced a considerable distance apart, e. g., from about 5 to about 20 feet, are used in place of the single middle electrode 13, and results in records of increased amplitude under these conditions.

Referring now to Figure 7, chart C shows the type of record which will be obtained by using the apparatus of Figure 3. It will be noted that the deflections obtained are all in single direction so that although a clear record of the levels at which discontinuities in the walls of the well occur is obtained, there is no indication as to whether the electrodes are entering a zone of higher or lower resistivity. Nevertheless, this record is extremely useful for correlation purposes.

Chart D of Figure 7 shows the record obtained on the apparatus of Figure 4, which gives the same information as chart C, but in a somewhat different form.

In using alternating current for logging wells according to my invention, a wide range of frequencies may be used, for example from about 25 to 100,000 or more cycles per second. When frequencies in the upper portion of this range are employed, inductance and capacitance effects due to the strata traversed by the electrodes become very pronounced, and the quantity actually measured by my method is the difference between the impedances of the formations just above and just below the middle electrodes. In this case a reactance is added to resistances 19 and 20 to obtain a perfect balance.

From the above description it will be seen that I have invented a novel and useful method and apparatus for logging wells. Although certain specific embodiments of my invention have been described in detail, I do not wish to be limited thereto, but only by the following claims, which should be construed as broadly as the prior art will permit.

I claim:

1. The method of logging earth formations traversed by a bore hole which comprises passing two electrical currents into said bore hole, the paths of said electrical currents in said bore hole including different vertically-disposed portions of the strata adjacent said bore hole, and producing electrical effects responsive to the relative magnitude of said electrical currents.

2. The method of logging earth formations traversed by a bore hole which comprises passing two electrical currents into said bore hole in separate circuits, each of said circuits comprising a different vertically-disposed portion of the strata penetrated by said bore hole, producing electrical effects responsive to the relative magnitude of said electrical currents, and repeating these steps at different levels in said bore hole, whereby a log indicative of the electrical properties of the strata penetrated by said bore hole is obtained.

3. The method of logging earth formations traversed by a bore hole containing a fluid which comprises continuously passing two electrical currents into said bore hole in separate circuits, each of said circuits comprising a different vertically-disposed portion of said fluid and of the strata penetrated by said bore hole, changing the level of the portions of said fluid and said strata included in said circuits while maintaining the relative levels of said included portions unchanged, producing electrical effects responsive to the relative magnitude of said electrical currents, and recording said electrical effects as a function of the position of said included portions in said bore hole, whereby a log indicative of the electrical properties of the strata penetrated by said bore hole is obtained.

4. The method of logging earth formations traversed by a fluid-containing bore hole which comprises continuously changing the level of at least three vertically-spaced electrodes in said bore hole, passing an electrical current between an intermediate electrode and an electrode above said intermediate electrode, passing a second electrical current between said intermediate electrode and an electrode below said intermediate electrode, producing electrical effects responsive to the relative magnitude of said electrical currents, and recording said electrical effects as a function of the depth of said electrodes.

5. The method of claim 4 wherein said electrical currents are of the direct current type.

6. The method of claim 4 wherein said electrical currents are of the alternating current type.

7. The method of logging earth formations traversed by a bore hole which comprises continuously lowering three vertically-spaced electrodes into said bore hole, passing an electrical current through each of two circuits, one of said circuits including the uppermost of said electrodes and the other of said circuits including the lowermost of said electrodes and the intermediate electrode, producing electrical effects responsive to the relative magnitude of said electrical currents, and recording said electrical effects as a function of the depth of said intermediate electrode.

8. The method of logging earth formations traversed by a bore hole which comprises lowering an array of five vertically-spaced electrodes into said bore hole, one pair of said electrodes being spaced relatively close to the intermediate of said electrodes, another pair of said electrodes being spaced at a relatively great distance from said intermediate electrode, passing separate electrical currents between said intermediate electrode and said first-mentioned pair of electrodes, producing electrical effects responsive to the relative magnitude of said electrical currents, passing additional separate electrical currents between said intermediate electrode and said second pair of electrodes, and producing electrical effects responsive to the relative magnitude of said additional electrical currents.

9. The apparatus for logging earth formations traversed by a bore hole which comprises means for passing electrical currents through two different vertically-disposed portions of the strata adjacent said bore hole, and means for producing electrical effects responsive to the relative magnitude of said electrical currents.

10. The apparatus for logging earth formations traversed by a bore hole which comprises means for passing electrical currents through two different vertically-disposed portions of the strata adjacent said bore hole, means for changing the level of said first-mentioned means in said bore hole, means for producing electrical effects responsive to the relative magnitude of said electrical currents, and means for recording said electrical effects as a function of the depth of said first-mentioned means.

11. The apparatus for logging earth formations traversed by a bore hole which comprises not less than three vertically-spaced electrodes, means for changing the level of said electrodes in said bore hole, means for passing an electrical current between the uppermost of said electrodes and an intermediate electrode, means for passing a second electrical current between the lowermost of said electrodes and an intermediate electrode, means for producing electrical effects responsive to the relative magnitude of said electrical currents, and means for recording said electrical effects as a function of the depth of said electrodes.

12. The apparatus of claim 10 wherein said electrical currents are of the direct current type.

13. The apparatus of claim 10 wherein said electrical currents are of the alternating current type.

14. The apparatus for logging earth formations traversed by a bore hole which comprises three vertically-spaced electrodes, means for changing the level of said electrodes in said bore hole, a source of electromotive force, means for passing a portion of electric current from said source of electromotive force between the uppermost of said electrodes and the intermediate electrode, means for passing another portion of said current between the lowermost of said electrodes and said intermediate electrode, means for producing electrical variations responsive to the relative magnitudes of said portions of electrical current, and means for recording said electrical variations as a function of the depth of said electrodes.

15. The apparatus of claim 13 wherein said source of electromotive force is of the direct current type and means are provided for periodically and simultaneously reversing the polarity of said electrodes without reversing the direction of current flow through said recording means.

16. The apparatus for logging earth formations traversed by a bore hole containing a fluid which comprises three vertically-spaced equidistant electrodes, means for continuously changing the level of said electrodes in said bore hole, a source of alternating current, means for passing a portion of said current between the uppermost of said electrodes and the intermediate electrode, means for passing another portion of said current between the lowermost of said electrodes and said intermediate electrode, means for producing electrical variations responsive to the relative magnitudes of said portions of current, means for amplifying said electrical variations, oscillograph means for photographically recording said amplified electrical variations, and means for synchronizing said recording means with said means for changing the level of said electrodes.

17. Apparatus for logging earth formations traversed by a bore hole comprising an array of five vertically-spaced electrodes, one pair of said electrodes being relatively close to the intermediate electrode in said array and a second pair of said electrodes being at a relatively large distance from said intermediate electrode, means for changing the level of said array in said bore hole, means for passing separate electrical currents between said intermediate electrode and each of the other electrodes in said array through the formations intercepted by said electrodes, means for producing electrical effects responsive to the relative magnitude of the electrical currents passing through said first-mentioned pair of electrodes, and means for producing electrical effects responsive to the relative magnitudes of the electrical currents passing through said second pair of electrodes.

18. The method of logging earth formations traversed by a bore hole which comprises passing electrical currents through different vertically disposed portions of the strata adjacent said bore hole, and producing electrical effects responsive to the relative magnitude of the electrical impedances of said portions of said strata.

19. The method of logging earth formations traversed by a fluid-containing bore hole which comprises continuously changing the level of an array of three vertically spaced electrodes within said bore hole, passing electrical currents between electrodes in said array through the portions of the strata adjacent said bore hole and between said electrodes, and producing and recording electrical effects responsive to the relative magnitude of the electrical impedances of said portions of said strata.

20. The apparatus for logging earth formations traversed by a bore hole which comprises three vertically spaced electrodes, means for changing the level of said electrodes in said bore hole, two resistances connected in series across the uppermost and lowermost of said electrodes, said two resistances and the portions of the strata adjacent said bore hole intercepted between the intermediate electrodes and said uppermost and lowermost electrodes being the four arms of a Wheatstone bridge circuit, means for applying a potential difference across one diagonal of said circuit and means connected across the other diagonal of said circuit for detecting potential differences.

PAUL F. HAWLEY.